US010162315B2

(12) United States Patent
Snyder et al.

(10) Patent No.: US 10,162,315 B2
(45) Date of Patent: Dec. 25, 2018

(54) PROCESS CONTROL SYSTEM USING TYPICAL AND ADAPTER COMPONENTS

(71) Applicant: EMERSON PROCESS MANAGEMENT POWER & WATER SOLUTIONS, INC., Pittsburgh, PA (US)

(72) Inventors: Jeffrey Thomas Snyder, Tarentum, PA (US); Steven Brent Hutchison, Sarver, PA (US)

(73) Assignee: EMERSON PROCESS MANAGEMENT POWER & WATER SOLUTIONS, INC., Pittsburgh, PA (US)

( * ) Notice: Subject to any disclaimer, the term of this patent is extended or adjusted under 35 U.S.C. 154(b) by 541 days.

(21) Appl. No.: 14/339,115

(22) Filed: Jul. 23, 2014

(65) Prior Publication Data

US 2016/0026162 A1 Jan. 28, 2016

(51) Int. Cl.
*G05B 11/42* (2006.01)
*G05B 13/02* (2006.01)

(52) U.S. Cl.
CPC .............. *G05B 11/42* (2013.01); *G05B 13/02* (2013.01)

(58) Field of Classification Search
None
See application file for complete search history.

(56) References Cited

U.S. PATENT DOCUMENTS 5,862,052 A * 1/1999 Nixon ................ G05B 19/0426 713/1
6,445,962 B1 * 9/2002 Blevins .................. G05B 13/02 700/37
1,004,039 A1 2/2011 Blevins et al.
(Continued)

FOREIGN PATENT DOCUMENTS

WO WO-03/001343 A2 1/2003

OTHER PUBLICATIONS

Search Report for Application No. GB1512345.8, dated Jan. 13, 2016.

*Primary Examiner* — Mohammad Ali
*Assistant Examiner* — Bernard G Lindsay
(74) *Attorney, Agent, or Firm* — Marshall, Gerstein & Borun LLP

(57) ABSTRACT

Methods, systems, and non-transitory, computer-readable medium are disclosed to enable a user to configure a process control system. A graphical programming user interface is described for generating coded native control components instantiated from typical and adapter components selected from a library of templates including respective control functions and associated logical expressions. In various embodiments, typical components represent a common core control process or function that is used among one or more other plant equipment devices in the process control system. In addition, various embodiments of the adapter components include one or more parameters that may be changed by a user in conjunction with the logical expressions and/or defined in terms of natural language expressions. As a result, (Continued)

the typical component and the adapter component are instantiated to provide a native control component that provides functionality with respect to one or more control loops within a process control system.

28 Claims, 11 Drawing Sheets

(56) References Cited

U.S. PATENT DOCUMENTS

| | | | | |
|---|---|---|---|---|
| 2003/0004585 | A1 | 1/2003 | Horn et al. | |
| 2003/0033037 | A1* | 2/2003 | Yuen | G05B 19/0426 700/86 |
| 2004/0039468 | A1* | 2/2004 | Zahorack | G06F 9/54 700/97 |
| 2005/0172258 | A1* | 8/2005 | Nixon | G05B 23/0216 717/100 |
| 2010/0058289 | A1* | 3/2010 | Hudson, III | G06F 8/20 717/105 |
| 2011/0009985 | A1* | 1/2011 | Nixon | G05B 19/0426 700/87 |
| 2014/0100676 | A1* | 4/2014 | Scott | G06F 3/0484 700/83 |

* cited by examiner

PROCESS CONTROL SYSTEM USING TYPICAL AND ADAPTER COMPONENTS

FIELD OF THE INVENTION

The present disclosure relates generally to process control systems and, in particular, to providing efficient configuration of such systems.

TECHNICAL BACKGROUND

Process control systems, such as distributed or scalable process control systems like those used in utility power, water, wastewater or other processes, typically include one or more process controllers communicatively coupled to each other, to at least one host or operator workstation, and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters.

A process controller typically receives signals indicative of process measurements made by the field devices and/or other information pertaining to the field devices, uses this information to implement a control routine, and generates control signals which are sent over the buses to the field devices to control the operation of the process. Information from the field devices and the process controller is typically made available via one or more applications that are executed by a workstation operator to perform a desired function with respect to the process, such as viewing the current state of a process, modifying the operation of a process, etc.

Some process control systems use algorithms or groups of algorithms located in the controller and/or in the field devices to perform control operations. In these process control systems, the process controller or another suitable device is configured to include and execute one or more algorithms, each of which receives inputs from and/or provides outputs to other algorithms (either within the same device or within different devices), and performs some process operation, such as measuring or detecting a process parameter, controlling a device, or performing a control operation, such as the implementation of a proportional-integral-derivative (PID) control routine. The different algorithms within a process control system are generally configured to communicate with each other (e.g., over a bus) to form one or more process control loops.

The term "algorithm" as used herein is not limited to specific protocols but, instead, includes any suitable type of block, program, hardware, firmware, etc., associated with any suitable type of control system and/or communication protocol that may be implemented to provide a control function. Moreover, algorithms may refer to basic functions such as Discrete Input (DI), Discrete Output (DO), Analog Input (AI), Analog Output (AO), PID control, PD control, PI control, P control, Control Selector, Bias/Gain Station, etc., as well as to advanced algorithms such as Setpoint Ramp Generator, Timer, Analog Alarm, Discrete Alarm, Deadtime, etc. Still further, the term algorithm as used herein may be a nested block, also referred to as a macro, which includes several algorithms, for example, or one or several macros. While algorithms typically take the form of objects within an object-oriented programming environment, algorithms may be defined using any desired data structure as part of any suitable software environment.

Process controllers are typically programmed to execute a different control function, sub-routine or control loop (which are control routines) for each of a number of different process loops defined for, or contained within a process, such as flow control loops, temperature control loops, pressure control loops, etc. As indicated above, each such control loop includes one or more input blocks, such as an analog input (AI) algorithm, a single-output control block, such as a proportional-integral-derivative (PID) or a fuzzy logic control algorithm, and an output block, such as an analog output (AO) algorithm.

Control routines, and the algorithms that implement such routines, are typically configured in accordance with a number of control techniques, including PID control, fuzzy logic control, and model-based techniques such as a Smith Predictor or Model Predictive control (MPC). In model-based control techniques, the parameters used in the routines to determine the closed loop control response are based on the dynamic process response to changes in the manipulated or measured disturbances serving as inputs to the process. A representation of this response of the process to changes in process inputs may be characterized as a process model. For instance, a first-order parameterized process model may specify values for the gain, dead time, and time constant of the process.

In a typical plant, an engineer may define and configure the process control strategy using a configuration system that runs on an operator workstation. Some configuration systems may include a library to store control function templates (typically made up of a number of algorithms), so that the engineer can select and generate an instance of a selected control element according to a particular application. The configuration system may also allow the engineer to modify or alter the generated instance of the selected control element before applying the instance to the process control environment by, for example, downloading the control element to a controller or a programmable field device.

For example, a template library typically stores various function templates that address basic measurement and control functionality. Templates can be autonomous or class-based (i.e., linked to instances instantiated from the class template and capable of propagating changes in the class template to the instances). An engineer will often use one or several function templates as a starting point in defining and configuring the corresponding process control scheme. However, because typical modifications to the function templates involve a significant engineering effort and require certain check-in, check-out, and documentation procedures, working with the template library may be time-consuming.

To simplify the task of configuring a process control system, configuration systems typically utilize several methods. In one approach, a collection of comprehensive reusable function templates and function classes is provided as part of a template library. Generally, function templates in the template library address the broadest contemplated range of configuration options and scenarios applicable to a particular function. The engineers who contribute to the template library build upon international standards such as ISA S88.0, IEC 61408, IEC 61131-3, etc., and incorporate experience and best practices from many hours of application and project engineering. Using a template library, an engineer can select a function template, modify values of function parameters to enable and configure the desired features, and disable the features unnecessary for the particular application.

For example, a certain template may allow eight possible inputs into a certain algorithm, and may accordingly include eight input blocks corresponding to these eight inputs. A user who needs only one of these inputs could effectively disable seven of the eight inputs by assigning the value FALSE to the corresponding parameters. A typical template from such a template library thus includes more features than a typical function that is specifically defined for a similar purpose. For example, a template from a template library for Continuous Control may include all the features of a corresponding specific template, as well as additional features related to equipment arbitration, support for optional tracking inputs and first out detection, conditional alarming with enable/disable capability and operator access, mode locking to optionally prevent operators from accessing the function, a failure parameter, etc. In short, a template from such a template library is likely to include all the functionality of a function an engineer may need for a particular project, and to use the function the engineer normally must change only some or all values of function parameters.

While such template libraries can significantly simplify the process of configuring process control, these template libraries unfortunately require a relatively large amount of controller memory. In particular, because engineers customize function templates by modifying function parameters, each instance inherits all algorithms from the parent function template, along with the associated parameters, regardless of whether a particular algorithm is operative in the instance. Moreover, configuration systems utilizing template libraries do not typically provide a "what you see is what you can have" user experience because each function instance retains the entire functionality of the corresponding function template within the template library, and engineers must examine many parameters to determine which algorithms and parameters are actually in use.

In a second approach at simplifying the task of configuring a process control system, a single function template may be implemented as opposed to a library of templates. In such an approach, a single function template addresses the broadest contemplated range of configuration options and scenarios applicable to every particular function within a process control system. Using the single function approach, an engineer can modify values of function parameters to enable and configure the desired features, and disable those features that are unnecessary for a particular system.

Although this approach also simplifies the configuration process, drawbacks once again include the requirement of a relatively large amount of controller memory. In addition, if additional functionality is later added to the control system, such as new devices that require new algorithms as part of their control loop, the entire template requires updating to include the new algorithms. Therefore, simplifying process control configuration systems without substantially increasing controller memory while also providing a user with flexibility and options for process control presents several challenges.

SUMMARY

Methods, systems, and non-transitory, computer-readable medium are disclosed to enable a user to configure a process control system. In various embodiments, a graphical programming user interface is described for generating coded native control components instantiated from typical and adapter components selected from a library of templates including respective algorithms and associated logical expressions. In various embodiments, typical components represent a common core control process or function that is used among one or more other control functions in the process control system. In addition, various embodiments of the adapter components include one or more parameters that may be changed by a user in conjunction with the logical expressions. As a result, the typical component and the adapter component are instantiated to provide a native control component that provides functionality with respect to one or more control loops within a process control system and can be loaded into the control system processors to perform the actual control function.

Furthermore, various embodiments of the present disclosure provide an adapter editing user interface that allows a user to change one or more parameters and/or expressions represented by one or more of the adapters and/or view the conditions associated with the logical expressions using natural language.

DETAILED DESCRIPTION OF THE DRAWINGS

DETAILED DESCRIPTION

Figure 1:
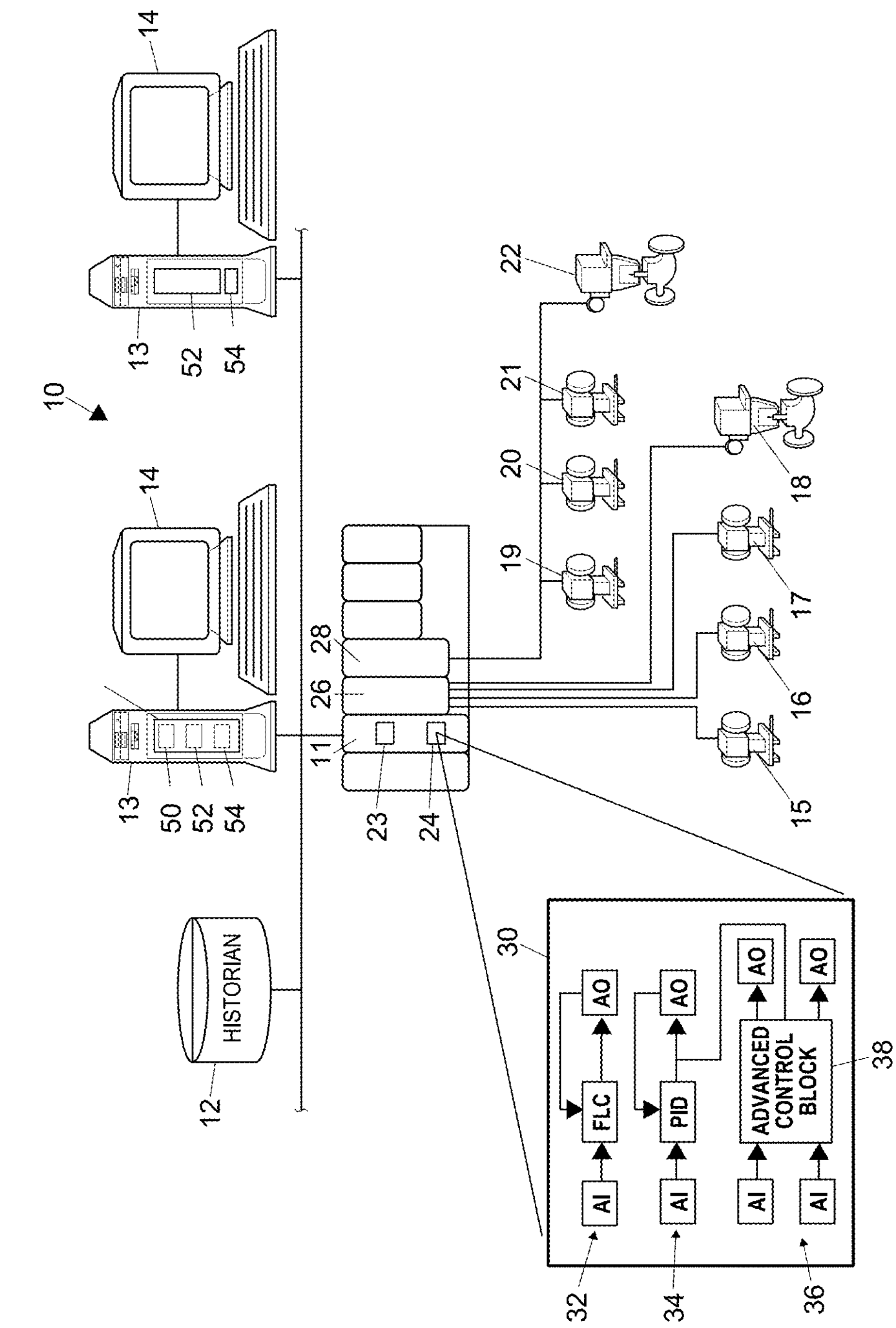
FIG. 1 is a schematic representation of a process control system 10 in accordance with various embodiments of the present disclosure.

FIG. 1 is a schematic representation of a process control system 10 in accordance with various embodiments of the present disclosure. In various embodiments, process control system 10 implements techniques of defining and/or editing one or more coded native control components as part of a process control configuration system. Process control system 10 includes a process controller 11 connected to a data historian 12 and to one or more host workstations 13 (which may be any type of personal computer, workstations, laptop computer, etc.), each having a display screen 14.

Process controller 11 is also connected to field devices 15-22 via input/output (I/O) cards 26 and 28. Data historian 12 may be any suitable type of data collection unit having any suitable type of memory and/or any suitable software, hardware and/or firmware for storing data. Data historian 12 may be separate from (as illustrated in FIG. 1) or integrated as a part of one or more of workstations 13. In an embodiment, process controller 11 is configured to communicate with host workstations 13 and with data historian 12 via any suitable communication link, which may include, for example, an Ethernet connection, any suitable wired bus, any suitable number of wireless links, a communication network, etc.

In an embodiment, process controller 11 is configured to communicate with one or more of field devices 15-22 using any suitable hardware and/or software in accordance with any suitable communication protocol. For example, in various embodiments, process controller 11 is configured to communicate with one or more of field devices 15-22 using standard analog current loop interfaces (e.g., 4-20 ma and 10-50 ma standards), digital current loop interfaces, and/or any suitable smart communication protocol such as the FOUNDATION Fieldbus protocol, the HART protocol, etc.

In various embodiments, field devices 15-22 may be implemented as any suitable type of device, such as sensors, valves, transmitters, positioners, etc., while I/O cards 26 and 28 may be implemented with any suitable type of I/O devices that conforms to any suitable communication and/or controller protocol. In the example process control system 10 illustrated in FIG. 1, field devices 15-18 could correspond to standard 4-20 mA devices that communicate over analog lines to the I/O card 26, while field devices 19-22 could correspond to smart devices, such as Fieldbus field devices, that communicate over a digital bus to I/O card 28 using Fieldbus protocol communications.

Process controller 11 includes a processor 23 and a controller memory 24. In accordance with various embodiments, processor 23 implements and/or oversees one or more process control routines, which may include any suitable number of control loops. In an embodiment, processor 23 is configured to communicate with devices 15-22, host workstations 13, and data historian 12 to facilitate a control process in any suitable manner. In variously embodiments, control routines may be stored in controller memory 24 or otherwise associated with process controller 11 (e.g., distributed among smart field devices 19-22).

In accordance with various embodiments, controller memory 24 is a computer-readable non-transitory storage device that may include any combination of volatile (e.g., a random access memory (RAM), or a non-volatile memory (e.g., battery-backed RAM, FLASH, etc.). In various embodiments, controller memory 24 is configured to store instructions executable on process controller 11. These instructions may include machine readable instructions that, when executed by process controller 11, cause process controller 11 to perform various acts as described herein.

Although FIG. 1 illustrates a single process controller 11, various embodiments include any suitable number of control routines and/or functions having portions thereof that are implemented or executed by any suitable number of controllers and/or by other devices. The control routines and/or functions described throughout this disclosure that are implemented within the process control system 10 may take any suitable form, such as software, firmware, hardware, etc. For the purpose of this disclosure, a process control function, or simply a function, may be any part or portion of a process control system including, for example, a routine, a block or any element thereof, stored on any computer readable medium.

Control routines, which may be functions or any part of a control procedure such as a subroutine, parts of a subroutine (such as lines of code), etc., may be implemented in any desired software format, such as using object-oriented programming, ladder logic, sequential function charts, algorithms, and/or an implementation of any suitable software programming language and/or design paradigm. Likewise, the control routines may be hard-coded into, for example, one or more EPROMs, EEPROMs, application specific integrated circuits (ASICs), and/or any other hardware or firmware elements. Thus, process controller 11 may be configured to implement a control strategy or control routine in any suitable manner.

In some embodiments, process controller 11 implements a control strategy using functions that constitute one or more algorithms. In process control system 10, a function may be consistent with any scheme in which one or more of control logic, resource logic, communication logic, transducer logic, etc. is encapsulated in a logic block. For ease of explanation, the terms "logic block" and "algorithm" are used herein interchangeably. Each algorithm is an object or other part (e.g., a subroutine) of the overall control strategy and operates in conjunction with other algorithms via one or more communications links to implement one or more process control loops within the process control system 10.

Algorithms typically perform one of an input function, a control function, or an output function. Input functions may include, for example, handling inputs associated with a transmitter, a sensor, and/or other process parameter measurement device. Control functions may include, for example, control associated with a control routine such as PID, fuzzy logic, etc. Output functions may include, for example, output handling associated with the operation of some device, such as a valve, that results in the performance of a physical function within process control system 10. As will be appreciated by those of ordinary skill in the relevant art(s), hybrid and other types of algorithms may also be implemented.

In some embodiments, algorithms may be stored in and executed by process controller 11 in accordance with some implementations. This may be the case when, for example, these algorithms are utilized in conjunction with standard 4-20 mA devices and some types of smart field devices, such as HART devices. In other embodiments, algorithms may be stored in and implemented by the field devices themselves, which may be the case with Fieldbus device implementations.

As illustrated by the exploded block 30 of FIG. 1, process controller 11 may include any suitable number of single-loop control routines, illustrated as routines 32 and 34. Additionally, process controller 11 may include any suitable number of advanced control loops, such as control loop 36, for example. Each control loop is typically referred to as a control function, a function, or a native control component. In the example shown in FIG. 1, single-loop functions 32 and 34 are illustrated as performing single loop control using a single-input/single-output fuzzy logic control block and a single-input/single-output PID control block, respectively. Furthermore, single-loop functions 32 and 34 are connected to appropriate analog input (AI) and analog output (AO) algorithms, which may be associated with process control devices such as valves, measurement devices such as temperature and pressure transmitters, or with any other device within the process control system 10.

In the example shown in FIG. 1, advanced control function 36 is illustrated as including an advanced control block 38 having inputs communicatively connected to one or more AI algorithms and outputs communicatively connected to one or more AO algorithms. The inputs of advanced control block 38 may be connected to other suitable algorithms or control elements to receive other types of inputs, and the output of advanced control loop 36 may be connected to other suitable algorithms to provide other types of control outputs. In various embodiments, advanced control block 38 may be any suitable type of model predictive control (MPC) block, neural network modeling or control block, a multi-variable fuzzy logic control block, a real-time-optimizer block, etc. As will be appreciated by those of ordinary skill in the relevant art(s), the algorithms and/or control functions illustrated in FIG. 1 may be executed by process controller 11, and/or may be located in and executed by any other suitable processing device, such as one or more of workstations 13, one or more of field devices 19-22, etc.

To define a control strategy of process control system 10 without excessive utilization of memory and/or processing resources, various embodiments of process control system 10 include implementing one or more control functions using an adapter component and a typical function template component. For example, single-loop control routines 32 and 34 each implement different control logic. More specifically, the single-loop control routine represented by control function 32 implements a fuzzy logic control, while single-loop control routine represented by control function 34 implements a PID control. Furthermore, exploded block 30 may include several other implementations of control routines and/or control functions that are not shown in FIG. 1, which could include additional PID and/or fuzzy logic control functions, for example.

In traditional process control systems, each separate control function is created separately, with a user selecting the appropriate parameters relevant to that specific control routine. For example, a user might need to specify a number of inputs, a number of outputs, a type of input scaling, various conditions, attributes, and/or parameters associated with the inputs and/or outputs, identify the type of input based on the corresponding field device (e.g., a pressure input versus a temperature input), etc.

In accordance with various embodiments, process controller 11 may include any suitable number of control functions corresponding to control routines from an instantiation of typical control function components and adapter components. In accordance with such embodiments, typical control function components are created as a set of one or more control blocks that share common process control characteristics and/or common control algorithms. For example, although process control system 10 only shows a few exemplary types of typical control function components, various embodiments of process control system 10 may have any suitable number of typical control function components, such as PID typical components, filtering typical components, scaling typical components, fuzzy logic typical components, etc.

In accordance with an embodiment, any of these different types of typical components may be instantiated with one or more adapter components to generate a specific control loop. In various embodiments, the adapter components allow a user the flexibility to define one or more logical expressions, parameters, attributes, etc., with respect to the specific control loop. In other words, a control function component provides a skeletal type of control loop function that is common to several control loops within process control system 10 (e.g., PID control could be utilized by several control loops within process control system 10) while an adapter component provides the variable parameters, input expressions, and attributes that, when instantiated with the typical control function component, results in a native control component for a specific control loop. In this way, native control components within process control system 10 may be instantiated from one or more typical control function components that have common control loop elements, and one or more adapter components that allow more specific control to be defined for each separate control loop process within process control system 10.

In various embodiments, a user may save the native control components created from typical control function and adapter components in a repository such as a database, for example, for use in configuring process control system 10. The examples below further illustrate the use of typical and adapter components to create control loop processes.

In the example illustrated in FIG. 1, workstations 13 include (either individually, in a distributed manner, etc.) a suite of operator interface applications 50 that support operations related to native control components having adapter components with optional expressions, parameters, and/or attributes. The suite of operator interface applications 50 may be utilized to access, view, edit, and/or supervise various functions of devices, units, and other elements connected within process control system 10.

In various embodiments, the suite of operator interface applications 50 may reside in a memory 52 of the workstation 13, and each of the applications or entities within the suite of various acts applications 50 may be executed on respective processors 54 associated with each workstation 13. In accordance with various embodiments, memory 52 is a computer-readable non-transitory storage device that may include any combination of volatile (e.g., a random access memory (RAM), or a non-volatile memory (e.g., battery-backed RAM, FLASH, etc.). Memory 52 is configured to store instructions executable on respective processors 54 process. These instructions may include machine readable instructions that, when executed by processors 54, cause processors 54 to perform various acts as described herein.

While the entire suite of applications 50 is illustrated in FIG. 1 as being stored in the workstation 13, some of these applications or other entities may be stored and/or executed by other workstations or computer devices within, associated with, or in communication with, process control system 10. Further, the suite of applications 50 may provide display outputs to the display screen 14 associated with the workstation 13 or any other desired display screen or display device, including hand-held devices, laptops, other workstations, printers, etc., which are not shown in FIG. 1. Likewise, the applications within the suite of applications 50 may be divided, partitioned, and/or separated and executed on two or more computers or machines, and may be configured to operate in conjunction with one another.

To support the techniques discussed herein, the suite of applications 50 may include a graphical programming interface to generate control functions, an adapter editor interface to allowing a user to select one or more adapter attributes, and/or an adapter diagnostic window to allow a user to view states and/or conditions associated with one or more logical expressions, parameters, attributes, etc.

Figure 2:
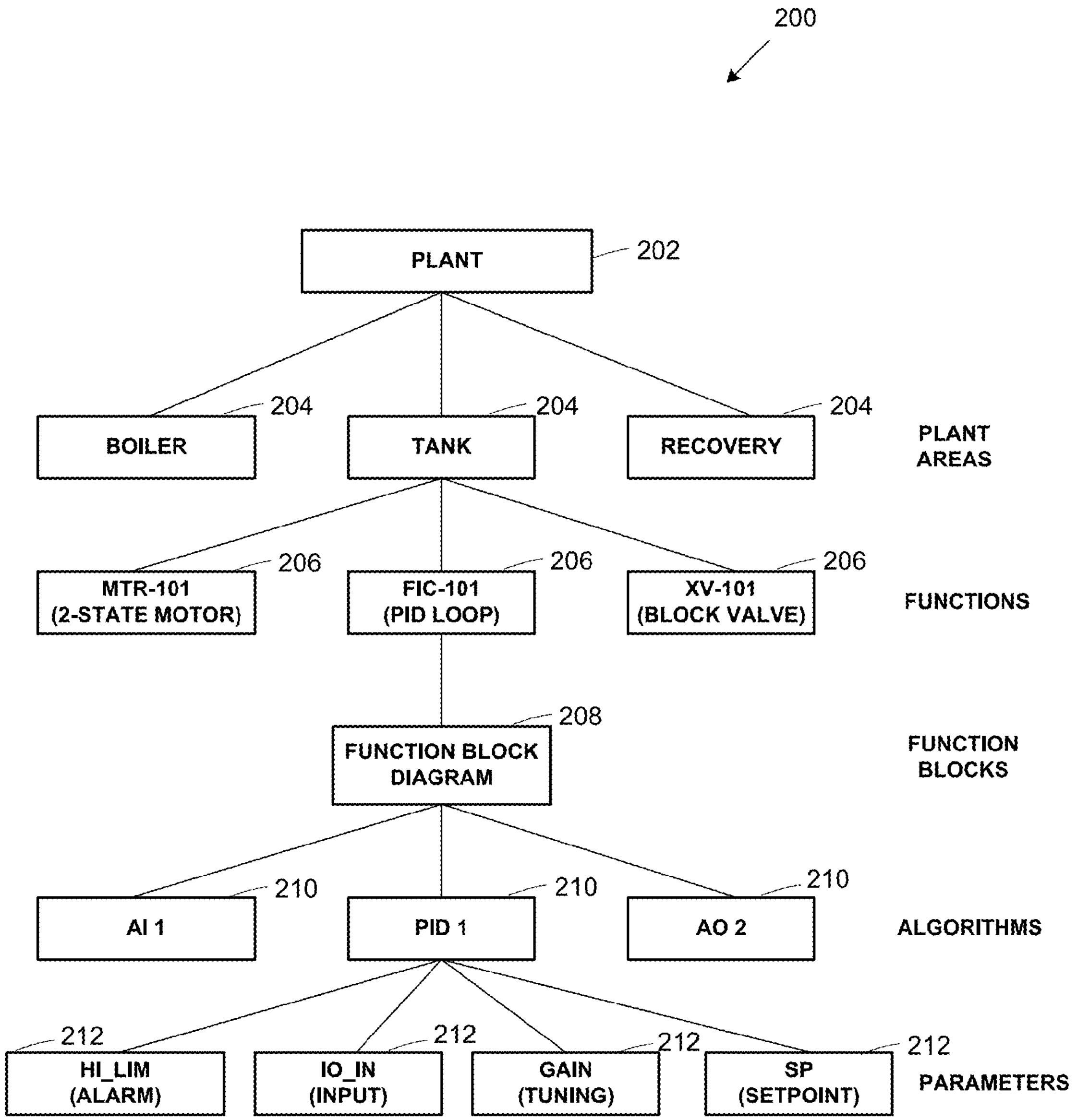
FIG. 2 is a block diagram that illustrates one example of a hierarchical structure 200 of control elements used in configuring process control systems as is known in the art.

FIG. 2 is a block diagram that illustrates one example of a hierarchical structure 200 of control elements used in configuring process control systems as is known in the art.

Hierarchical structure 200 represents a top-down engineering approach to developing a process control strategy. Starting with a plant 202 at the highest level of a tree-like structure, structure 200 includes multiple levels at which a user may view or configure control elements. The plant 202 may be, for example, a chemical plant, an oil refinery, an automated factory, or any other environment with a controlled and (at least partially) automated process. As illustrated in FIG. 2, the plant 202 may include one or several plant areas 204 which, in turn, may include functions 206 to perform a certain basic or advanced control task. A function block diagram 208 may define the control logic of the corresponding function 206 as one (in a trivial case) or several (in a non-trivial case) interconnected algorithms 210. In this sense, the function block diagram 208 defines the structure of the function 206. The algorithms 210, in turn, correspond to parameters 212. In this example, a proportional-integral-derivative (PID) algorithm is responsible for a control function that depends on tuning parameters such as gain, a certain setpoint (e.g., target pressure), an input signal, etc. In the suite of applications 50, each of the elements 202-212 may be represented by a data structure, a software object, or any other aggregation of data. At least some of the elements also correspond to physical elements in hierarchical structure 200, to parts of physical elements or, conversely, to groupings of physical elements. For example, a PID loop function 206 may correspond to a valve, a positioner, and a sensor, while the gain tuning parameter 212 may correspond to a value stored in a controller memory, a signal propagated via an analog signaling line, etc.

Figure 3:
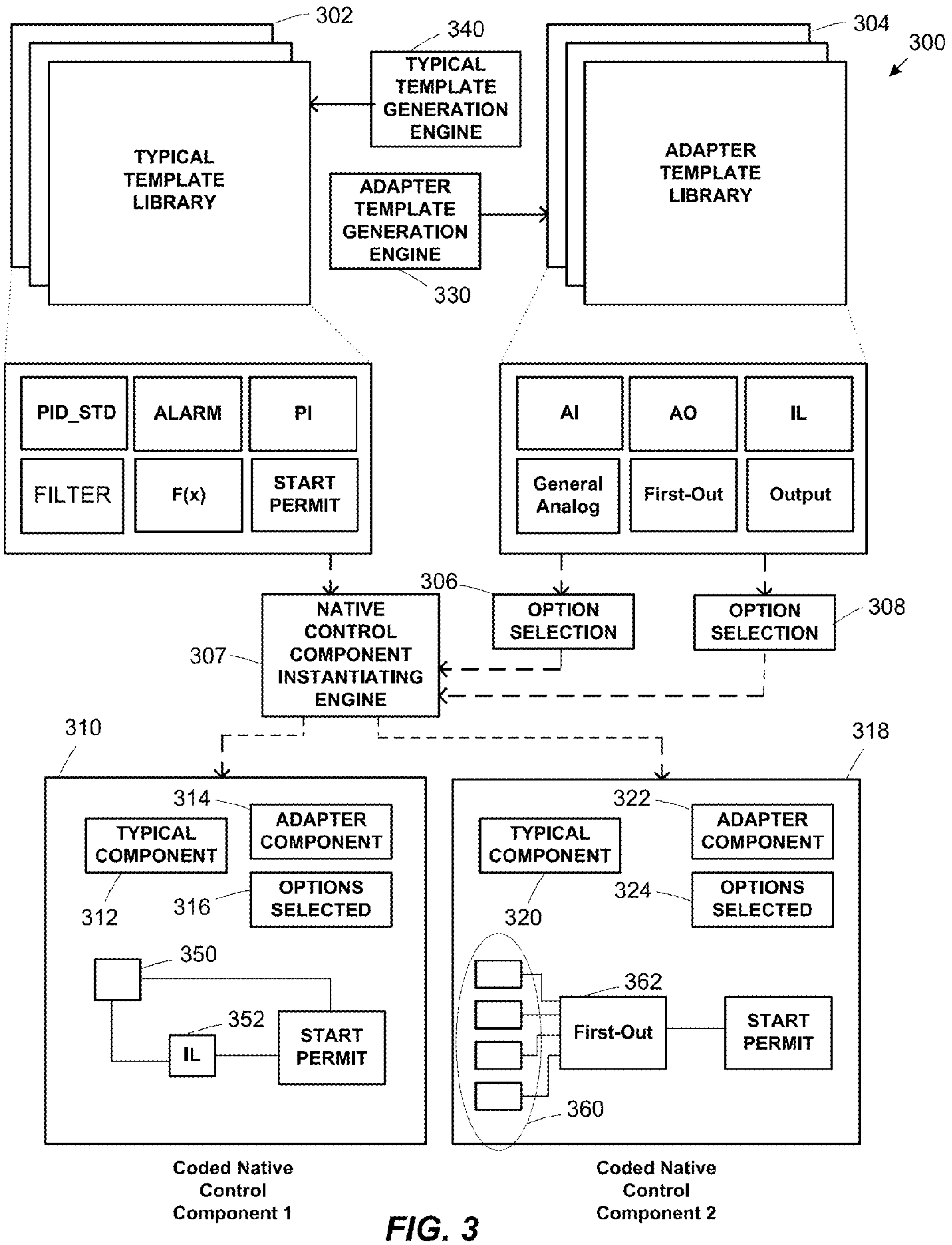
FIG. 3 is a block diagram of an example graphical programming interface 300 in accordance with various embodiments of the present disclosure.

FIG. 3 is a block diagram of an example graphical programming interface 300 in accordance with various embodiments of the present disclosure. In various embodiments, graphical programming interface 300 is an implementation of one or more programs that are part of a suite of applications 50, as shown in FIG. 1. In an embodiment, graphical programming interface 300 displays a typical template library 302 and an adapter template library 304.

In various embodiments, typical template library 302 could include, for example, a number of typical template control function components that may be common among one or more control loop scenarios any/or among any suitable number of specific field devices. As shown in FIG. 3, examples of typical templates within typical template library 302 include control logic blocks that implement various control operations, such as standard PID control logic blocks (PID_STD), alarm control logic blocks, proportional integral (PI) control logic blocks, filtering control logic blocks, function control logic blocks, start permit control logic blocks, etc.

In various embodiments, adapter template library 304 could include, for example, a number of adapter template components that include one or more options, such as input expressions, parameters, and/or attributes that are defined by a user, and, once instantiated with a typical template control function component, provide specific control loop functionality.

To address considerations regarding controller memory, preserving processing power, reducing the complexity of presentation of a control function to a user, etc., graphical programming interface 300 allows users to derive instantiated control functions (i.e., native control components) that control specific process functions using one or more different adapter components with the same typical control function that is selected from typical control function template library 302. As a result, in the example shown in FIG. 3, although the coded native control components 310 and 318 are based on a typical control function template, native control component 310 is structurally distinct from native control component 318.

For example, native control component 310 includes an in-line adapter component that could allow a user to define additional logical expressions based on the specific start permit control loop in which native control component 310 is to be used. This logic could be based on the control desired for a particular field device (e.g., a low-voltage motor, a three-phase motor, a stepper motor, etc.). Although both start permits may utilize alarm conditions to determine whether to start, in contrast to native control component 310, native control component 318 allows for multiple alarm conditions to be handled through the first-out alarm adapter, which may be input by a user in terms of logical expressions that are linked to the desired alarm inputs from one or more field devices. In this way, adapter component templates allow a user to specify differences between control loops, while common typical control function component templates allow a user to reuse algorithms for control loop operations that are common among different control loops.

The native control components shown in FIG. 3 are simplified for brevity, but various embodiments include native control components 310 and 318 implementing any suitable number of different logical expressions, parameters, attributes, etc. Furthermore, various embodiments provide for native control components to be coded from any suitable number of adapter component templates and typical control function component templates. For example, a native control component may implement desired control loop functionality using a single typical control function component template and several adapter component templates, and vice-versa.

Upon completing the design of a native control component, a user may save the respective native control components in any suitable storage device, such as in memory 24 of workstation 13, as shown in FIG. 1, in a separate database, in an online repository, etc.

A typical template generation engine 340 operating in the graphical programming interface 300 may allow a user to create and/or define new typical templates, modify existing typical templates, and perform any suitable functions related to template configuration and management. In various embodiments, typical template generation engine 340 may cooperate with a user interface that allows users to select of one or multiple component templates, and perform other functions discussed in more detail below. In various embodiments, typical template generation engine 340 is implemented as one or more processors, such as processor 54 of workstation 13, for example, as shown in FIG. 1.

Similarly, an adapter template generation engine 330 operating in the graphical programming interface 300 may allow a user to create and/or define new adapter templates, modify existing adapter templates, and perform any suitable functions related to template configuration and management. In various embodiments, adapter template generation engine 330 may cooperate with a user interface that allows users to select one or multiple component templates, and perform other functions discussed in more detail below. In various embodiments, adapter template generation engine 330 is implemented as one or more processors, such as processor 54 of workstation 13, for example, as shown in FIG. 1.

Further, in various embodiments, a native control component instantiating engine 307 may generate coded native control components 310 and 318 in response to user commands. In particular, native control component instantiating engine 307 may allocate memory for the selected optional components of adapter templates, generate instructions executable on a controller and/or a field device, etc. In various embodiments, typical template generation engine 330 is implemented as one or more processors, such as process controller 11 and/or processor 23, for example, as shown in FIG. 1. In an embodiment, native control component instantiating engine 307 instantiates the typical component template with the adapter component template to generate the native control component as machine-readable code that is executable by one or more processors to facilitate a process control operation.

Prior to, or at the time of generating coded native control components 310 and 318, graphical programming interface 300 may indicate to the user that the adapter templates selected from adapter template library 304 includes optional components, which could be logical expressions, parameters, attributes, etc. In various embodiments, graphical programming interface 300 may display a graphical dialogue screen, a text-based dialogue screen, a spreadsheet, or any other form of user interface to request that the user specify optional input expressions and/or parameters that should be included in native control component 310 and/or native control component 318.

In the example shown in FIG. 3, for native control component 310, a user could define the appropriate device 350 associated with the start permit typical template, which could be, for example, a switch, a key panel, etc. Additionally, a user could assign one or more inputs, logical expressions, outputs, and/or parameters for the IL adapter component 352. For example, a user could specify one or more logical expressions associated with IL adapter component 352 that are based on input received from device 350, which result in the start permit control function providing a start command when the logical expressions are satisfied. In other words, IL adapter component 352 may allow a user to utilize the appropriate "glue logic" between one or more devices that, when satisfied, enables one or more control signals to be sent from the start permit control block. This could be, for example, one or more alarm conditions that override a command signal from device 350 indicating that a motor start is requested.

In the example shown in FIG. 3 for native control component 318, a user could define the appropriate number and type of alarm inputs 360 associated with the first-out adapter 362, which could be, for example, any suitable number of alarm conditions utilized in conjunction with a first-out alarm system. In addition, a user could assign one or more inputs, expressions, and/or parameters for the adapter 362. For example, a user could specify one or more logical expressions, functions, etc., associated with adapter 362 that are based on alarm inputs 360, which result in the start permit control function receiving the first triggered alarm as a stop override.

Figure 4:
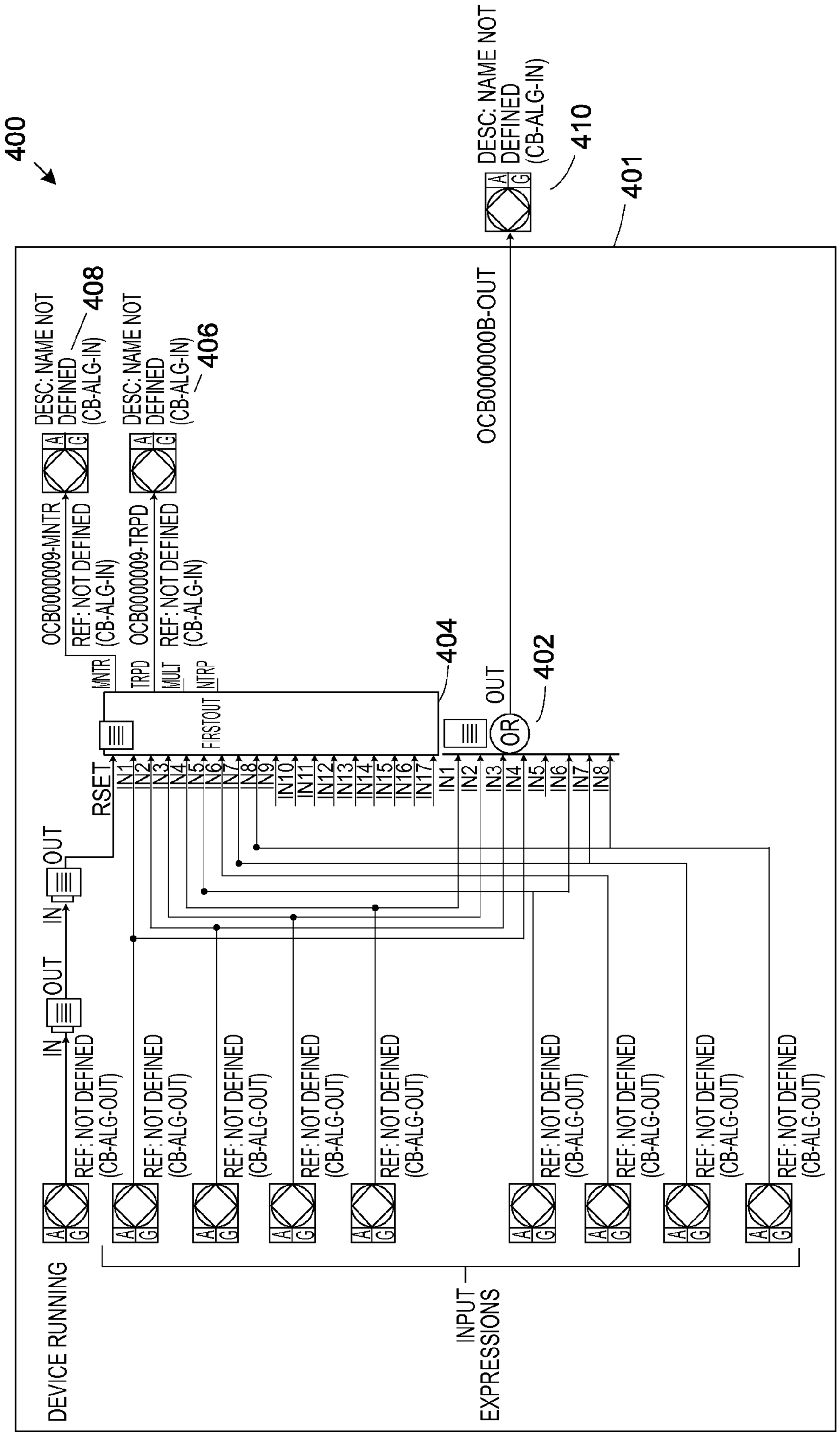
FIG. 4 is a schematic representation 400 of an example output adapter component in accordance with various embodiments of the present disclosure.

FIG. 4 is a schematic representation 400 of an example first out adapter component in accordance with various embodiments of the present disclosure. In an embodiment, schematic representation 400 is utilized in conjunction with instantiation of a native control component, such as native control components 310 and/or 318, for example, as shown in FIG. 3. In various embodiments, schematic representation 400 is displayed and modified as part of a graphical programming interface, such as graphical programming interface 300, as shown in FIG. 3.

As shown in FIG. 4, first out adapter component 401 illustrates a schematic representation of an adapter. First out adapter component 401 includes a logical OR gate symbol 404 and a first-out alarm block 404. In various embodiments, first out adapter component 401 is an implementation of an adapter selected by a user from an adapter template library, such as adapter template library 304, as shown in FIG. 3. First out adapter component 401 allows a user to enter one or more input expressions to the eight respective inputs as illustrated in FIG. 4. As will be appreciated by those of ordinary skill in the relevant art(s), the input expressions may be any suitable logical expression used in conjunction with an alarm condition. Although any of the expressions may indicate a signal indicative of an alarm condition received from one or more field devices, the input expressions may also include more complex expressions. For example, an input expression could be entered to assert an input to the OR gate symbol based on an input signal being a high (or low) logic value for a certain period of time, once an input signal amplitude exceeds (or falls below) a threshold value, etc.

Furthermore, embodiments allow a user to configure first out adapter component 401 for one or more specific control loops by utilizing additional device inputs in addition to any input expressions that may be entered. Using the example shown in FIG. 4, a signal that is transmitted once a device is running could be used to clear a previous alarm condition. As shown in FIG. 4, the control logic represented by a user configuring first out adapter component 401 may be used in conjunction with a typical control function component. In this example, output 410 indicates that one or more of the input expressions associated with an alarm condition have been met. In addition, outputs 406 and 408 may be utilized in a typical control function component as part of any number of control loops. To provide an illustrative example, assume that first out adapter component 401 is implemented as part of a typical control function component for a control loop. If a number of control loops utilize first-out alarm logic, then a user may tailor the input expressions, device inputs, and outputs 406, 408, and 410 for each of these control loops using the same typical control function component to do so, and configuring the adapter control function component as needed for each different control loop.

In other words, a number of control loops within a process control system may utilize one or more device resets, monitored output (e.g., output 408), first-out tripped alarm outputs (e.g., output 406), and start-permit outputs (e.g., output 410). In accordance with various embodiments, a user may define and/or map input expressions, output expressions, device inputs, and/or device outputs for each adapter for such various control loops. In various embodiments, the adapter used throughout each of the configured control loops is schematically the same, allowing a user to simply select and configure those parts within the adapter that need to be changed accordingly.

Figure 5:
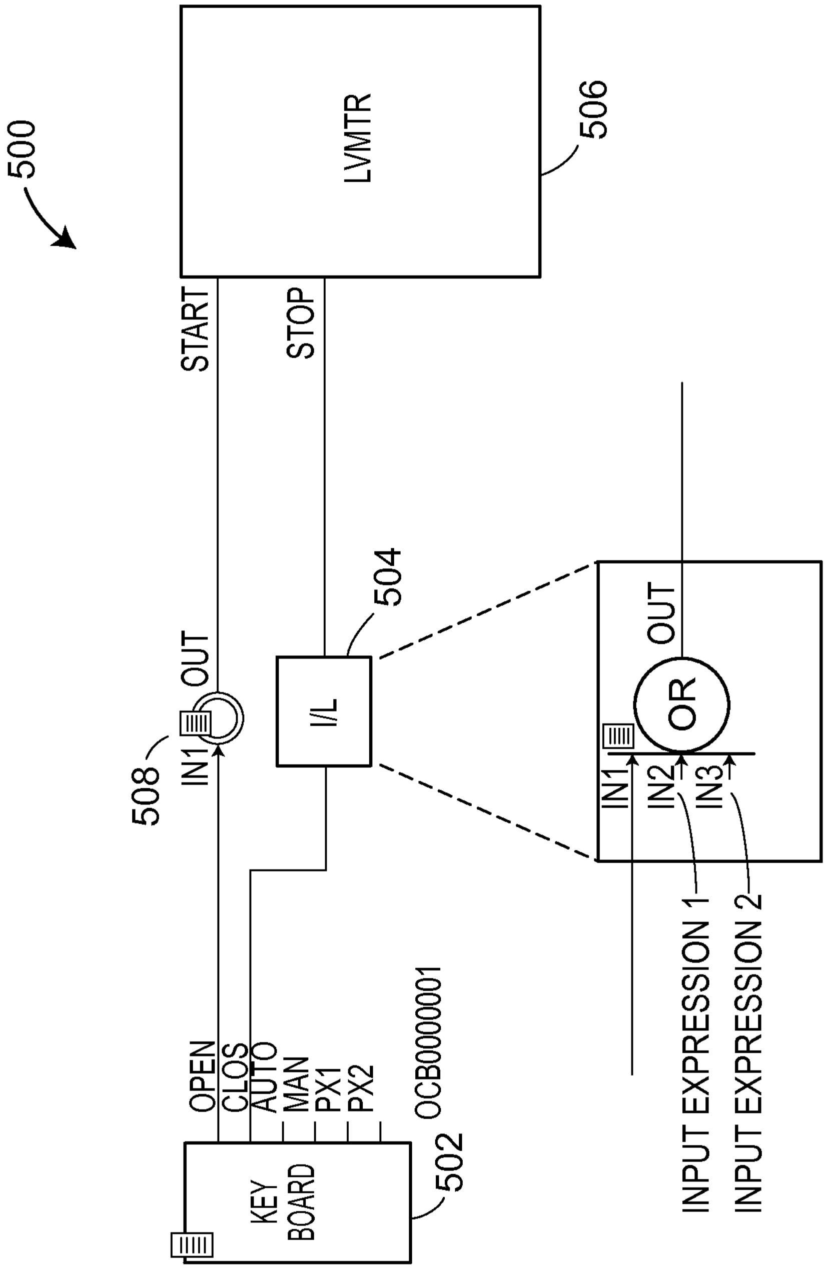
FIG. 5 is a schematic representation 500 of an example in-line adapter component in accordance with various embodiments of the present disclosure.

FIG. 5 is a schematic representation 500 of an example in-line adapter component in accordance with various embodiments of the present disclosure. In an embodiment, schematic representation 500 is utilized in conjunction with instantiation of a native control component, such as native control components 310 or 318, as shown in FIG. 3. In various embodiments, schematic representation 500 is displayed and modified as part of a graphical programming interface, such as graphical programming interface 300, as shown in FIG. 3.

As shown in FIG. 5, schematic representation 500 includes a keyboard device 502, a switch 508, a low voltage motor block 506, and an in-line adapter component 504. In various embodiments, in-line adapter component 504 is an implementation of an adapter selected by a user from an adapter template library, such as adapter template library 304, as shown in FIG. 3. In an embodiment in-line adapter component 504 is an implementation of in-line adapter 352, as shown in FIG. 3.

Figure 6:
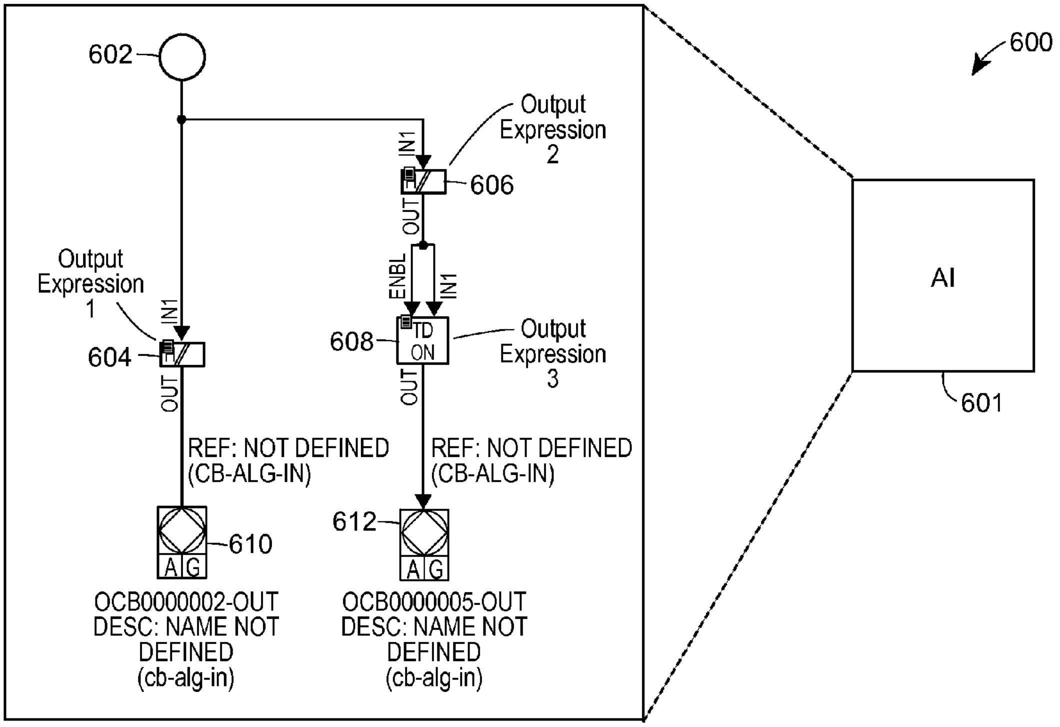
FIG. 6 is a schematic representation 600 of an example analog input adapter component in accordance with various embodiments of the present disclosure.

As shown in FIG. 5, in-line adapter component 504 is a schematic representation of an adapter. Using a graphical programming interface, a user may select in-line adapter component 504 and assign a desired logical aggregator, input expressions associated with the logical aggregator, and/or parameters associated with the input expressions. For example, as shown in FIG. 6, a user has selected a 3-input OR gate aggregator. The user may assign the existing "CLOS" output from keyboard device 502 to the first (i.e., top) input of in-line adapter component 504 by making the appropriate schematic connections and assigning the two additional desired input expressions and/or parameters to the remaining two inputs.

As will be appreciated by those of ordinary skill in the relevant art(s), various embodiments of the present disclosure provide a user with any suitable number and type of logical aggregators to provide control loop functionality. For example, logical aggregators could include AND gates, XOR gates, NOR gates, NAND gates, XNOR gates, latches, timers, counters, etc., which may include any suitable number of appropriate inputs.

As a result, in-line adapter component 504 provides a user with greater control loop functionality. In this case, the additional input expressions provide more control for when the start signal is sent to the low voltage motor block 506. More specifically, the typical start permit motor control logic simply starts the motor when a signal is received via switch 508. Without in-line adapter component 504, a user would need to select a start permit template that included the logic for these additional input expressions, which would require additional start permit templates for each motor in which additional control was sought. Therefore, in-line adapter component 504 advantageously allows a user to utilize the same typical start permit logic but add additional control through the use of in-line adapter component 504. Again, as will be appreciated by those of ordinary skill in the relevant art(s), the input expressions utilized in FIG. 5 may be any suitable expressions used in making a determination of whether to send a motor stop condition.

FIG. 6 is a schematic representation 600 of an example analog input adapter component in accordance with various embodiments of the present disclosure. In an embodiment, schematic representation 600 is utilized in conjunction with instantiation of a native control component, such as native control components 310 or 318, as shown in FIG. 3. In various embodiments, schematic representation 600 is displayed and modified as part of a graphical programming interface, such as graphical programming interface 300, as shown in FIG. 3.

As shown in FIG. 6, schematic representation 600 includes an analog input adapter component 601, which includes algorithm points 604, 606, and 608. Analog input adapter component 601 provides output signals at outputs 610 and 612. In some embodiments, algorithm points 604, 606, and 608 include respective output expressions to provide an analog-to-analog relationship between input 602 and outputs 610 and 612. In other embodiments, algorithm points 604, 606, and 608 include respective output expressions to provide an analog-to-digital relationship between input 602 and outputs 610 and 612.

As shown in FIG. 6, analog input adapter component 601 is a schematic representation of an adapter. In various embodiments, analog input adapter 601 is an implementation of an adapter selected by a user from an adapter template library, such as adapter template library 304, as shown in FIG. 3. Using a graphical programming interface, a user may select analog input adapter component 601 and assign desired output expressions and/or parameters associated with the output expressions. For example, as shown in FIG. 6, a user may assign the output expressions 1, 2, and 3 with algorithm points 604, 606, and 608, respectively. In addition, a user may define the input/output relationship by making the appropriate schematic connections between input 602, algorithm points 604, 606, 608, and outputs 610 and 612.

In various embodiments, algorithm points 604, 606, and 608 represent one or more algorithms that are selected by a user in the form of respective output expressions. Additional examples of these output expressions will be further discussed below, but in various embodiments allow a user to modify signals received at input 602 associated with one or more devices that are part of the corresponding control loop in which analog input adapter 601 is a part. Examples of algorithms could include any suitable analog function, such as level-shifting, scaling, smoothing, filtering, etc., and any suitable digital output logic function, such as a comparator function, logic expressions based on an input signal being above a threshold for a period of time, etc.

For example, output expressions 1 and 2 could provide smoothing functions, which condition the input received at input 602. To provide another example, output expression 3 could provide an analog comparator function that results in output signals being sent to output 612 only when the conditioned input signals exceed (or fall below) a set threshold defined by one or more expression parameters.

As a result, analog input adapter component 601 provides a user with greater control loop functionality. In this case, the output expressions provide several outputs from a single input, thus accomplishing greater control within the control loop in which analog input adapter component 601 is utilized. Although only three algorithm points are shown in FIG. 6, various embodiments of analog input adapter component 601 include any suitable number of algorithm points based on one or more input signals. In this way, a single analog input signal may be adapted to provide one or more outputs, and thus greater control, within a control loop.

Figure 7:
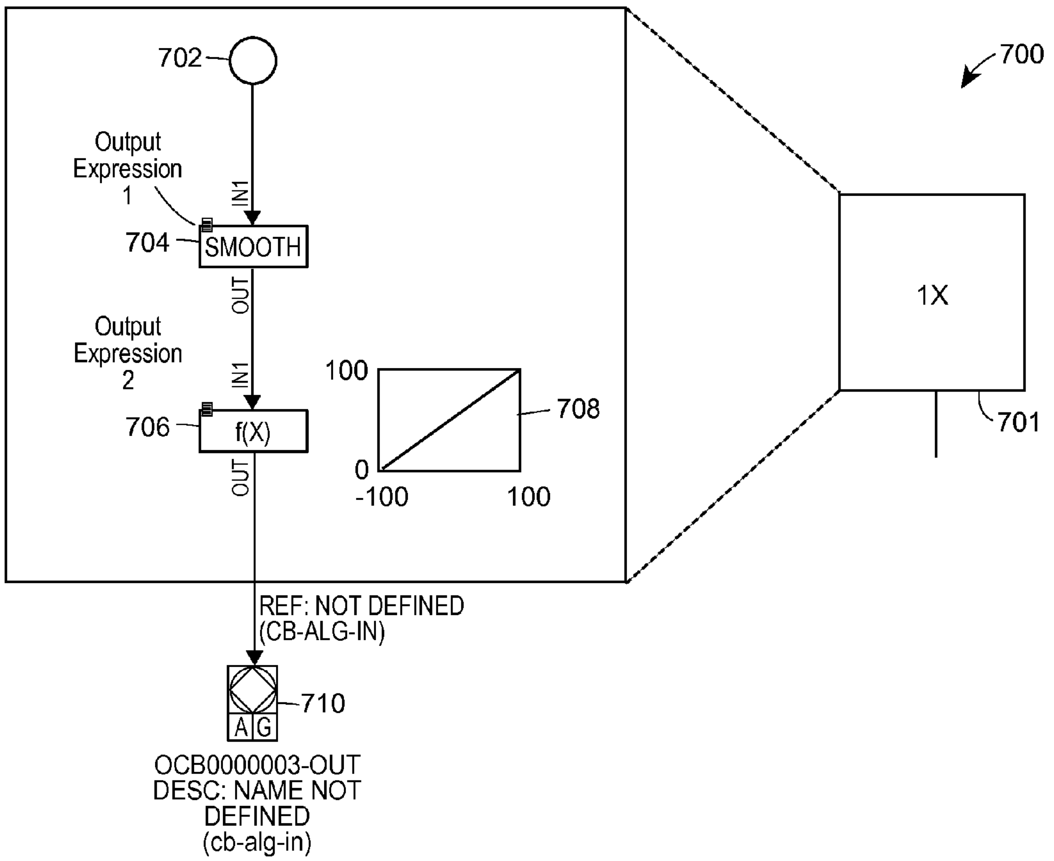
FIG. 7 is a schematic representation 700 of an example analog input adapter component in accordance with various embodiments of the present disclosure.

FIG. 7 is a schematic representation 700 of an example analog input adapter component in accordance with various embodiments of the present disclosure. In an embodiment, schematic representation 700 is utilized in conjunction with a control function template, such as the ones used to instantiate native control components 310 or 318, as shown in FIG. 3. In various embodiments, schematic representation 700 is displayed and modified as part of a graphical programming interface, such as graphical programming interface 300, as shown in FIG. 3.

As shown in FIG. 7, schematic representation 700 includes an analog input adapter component 701, which includes algorithm points 704 and 706. In various embodiments, analog input adapter component 701 is an implementation of an adapter selected by a user from an adapter template library, such as adapter template library 304, as shown in FIG. 3. Analog input adapter component 701 provides an output signal at output 710. In some embodiments, algorithm points 704 and 806 include respective output expressions to provide an analog-to-analog relationship between input 702 and output 710. In other embodiments, algorithm points 704 and 706 include respective output expressions to provide an analog-to-digital relationship between input 702 and output 710.

As shown in FIG. 7, analog input adapter component 701 is a schematic representation of an adapter. Using a graphical programming interface, a user may select analog input adapter component 701 and assign desired output expressions and/or parameters associated with the output expressions. For example, as shown in FIG. 7, a user may define output expression 1 to provide a smoothing function on analog signals received at input 702. Using this example, a user may select appropriate sampling rates and/or filtering parameters to accomplish the desired smoothing function, which is represented by algorithm point 704. As will be appreciated by those of ordinary skill in the relevant art(s), output expression 1 may include any suitable algorithm parameters to provide the desired functionality based on a specific application, process control, etc.

To provide another example, output expression 2 could provide an analog scaling function, as illustrated by graph 708. In other words, output expression 2 allows a user to enter the appropriate linear scaling parameters to level shift and/or scale the smoothed data signals received from algorithm point 704, using the example as shown in FIG. 7. Although graph 708 illustrates a linear relationship at algorithm point 706, various embodiments provide a user with the ability to modify output expression 2 in accordance with any suitable function, such as logarithmic, exponential functions, etc.

As a result, analog input adapter 701 provides a user with greater control loop functionality. In this case, the output expressions provide several means to condition signals received via a single input. Although only two algorithm points are shown in FIG. 7, various embodiments of analog input adapter component 701 include any suitable number of algorithm points based on one or more input signals. In this way, a single analog input signal may be conditioned and adapted to provide one or more desired signals within a control loop.

Figure 8A:
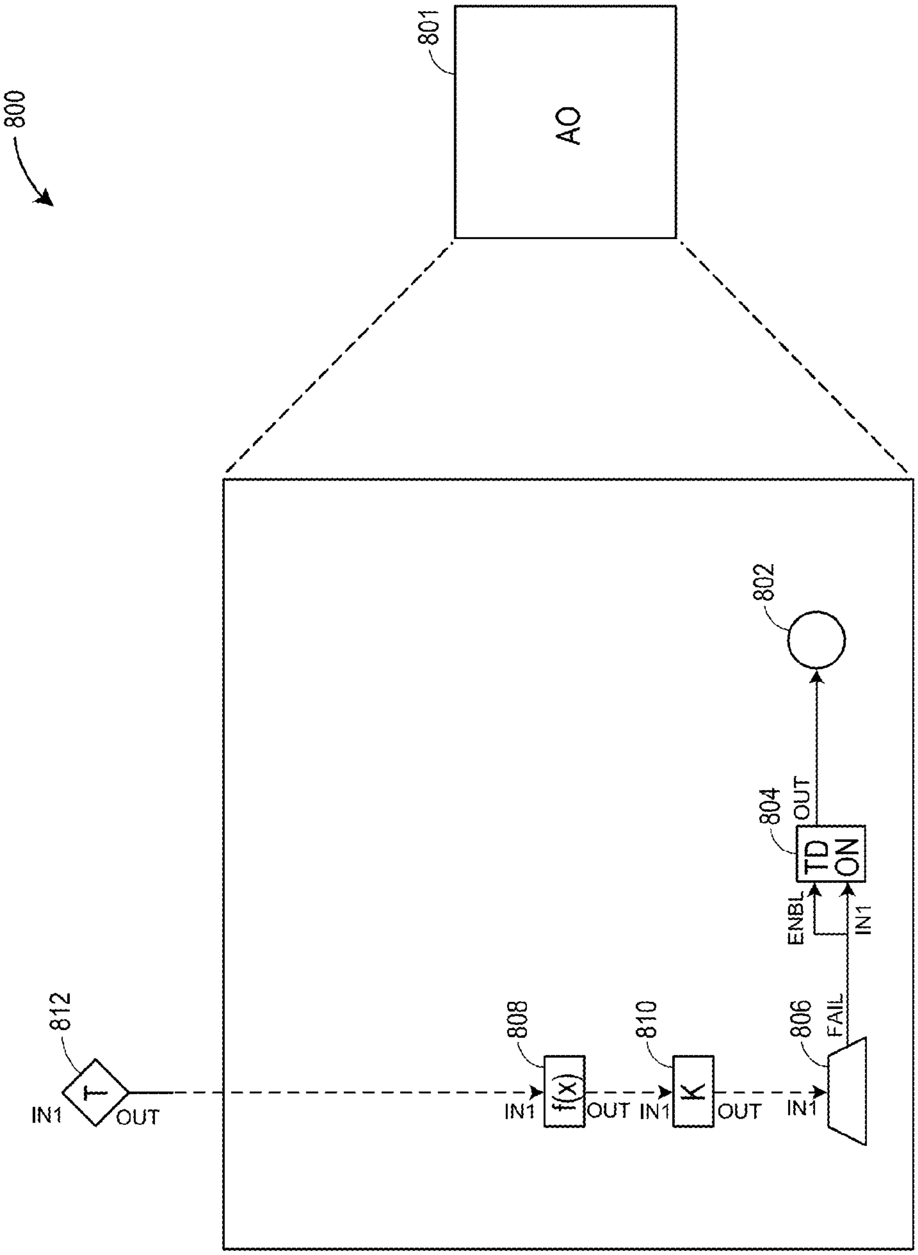
FIG. 8A is a schematic representation 800 of an example analog output adapter component in accordance with various embodiments of the present disclosure.

FIG. 8A is a schematic representation 800 of an example analog output adapter component in accordance with various embodiments of the present disclosure. In an embodiment, schematic representation 800 is utilized in conjunction with instantiation of a native control component, such as native control components 310 or 318, as shown in FIG. 3. In various embodiments, schematic representation 800 is displayed and modified as part of a graphical programming interface, such as graphical programming interface 300, as shown in FIG. 3.

As shown in FIG. 8A, schematic representation 800 includes an analog output adapter component 801, which includes algorithms 804, 806, 808, and 810. In various embodiments, analog output adapter component 801 is an implementation of an adapter selected by a user from an adapter template library, such as adapter template library 304, as shown in FIG. 3. Analog output adapter component 801 receives an input signal at input 812, which could represent an analog signal associated with a demand from an Auto/Manual station, for example. A shown in FIG. 8A, the analog value from input 812 may correspond to a suitable varying demand value, such as those utilized by a feedwater control valve, for example.

As shown in FIG. 8A, analog output adapter component 801 is a schematic representation of an adapter. Using a graphical programming interface, a user may select analog output adapter component 801 and assign desired parameters associated with the algorithms 804, 806, 808, and 810. As will be appreciated by those of ordinary skill in the relevant art(s), this may include any suitable algorithm parameters to provide the desired functionality based on a specific application, process control, etc.

Figure 8B:
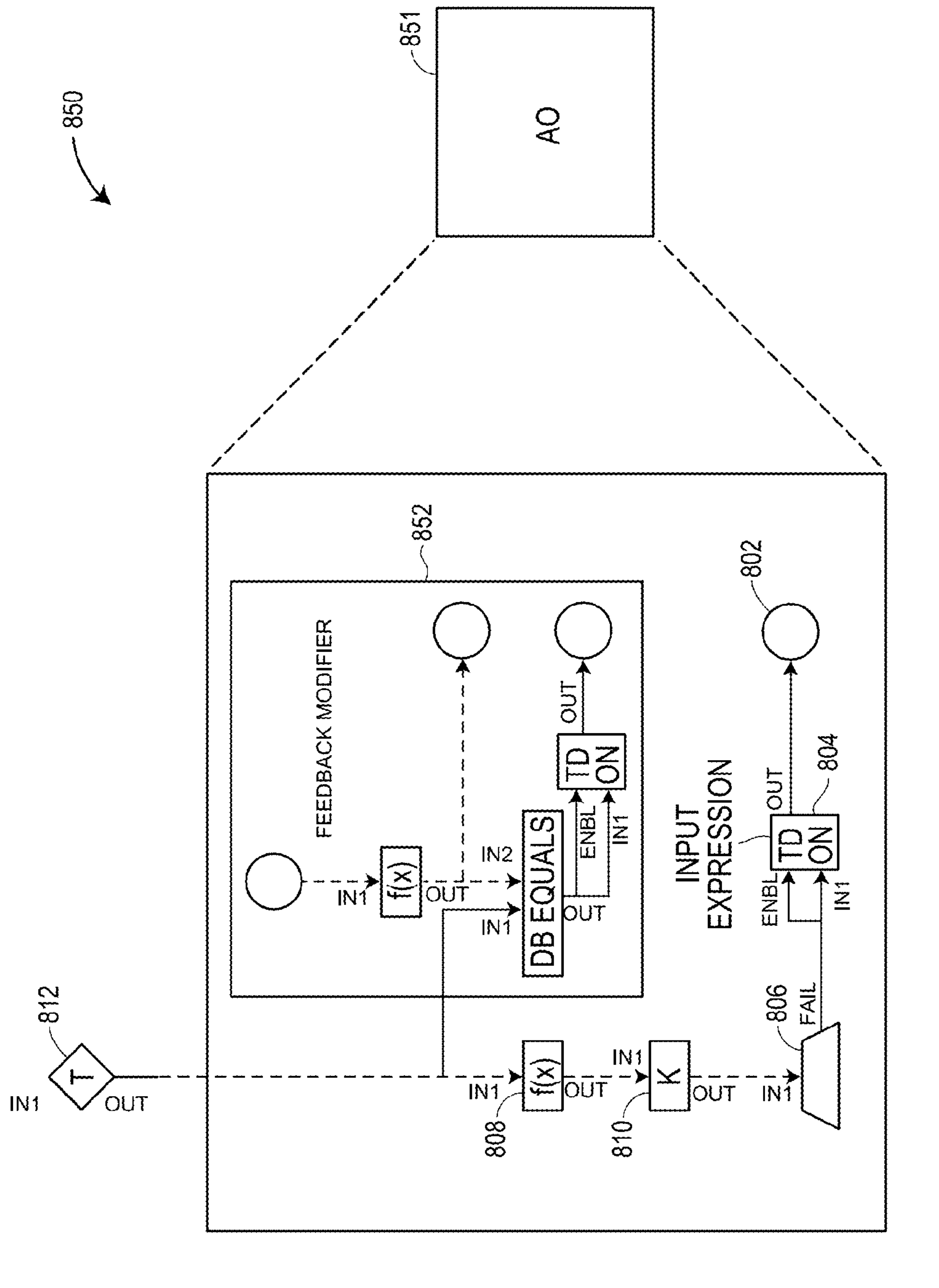
FIG. 8B is a schematic representation 850 of an example analog output adapter component in accordance with various embodiments of the present disclosure.

FIG. 8B is a schematic representation 850 of another example analog output adapter component in accordance with various embodiments of the present disclosure. In an embodiment, schematic representation 850 is utilized in conjunction with instantiation of a native control component, such as native control components 310 or 318, as shown in FIG. 3. In various embodiments, schematic representation 850 is displayed and modified as part of a graphical programming interface, such as graphical programming interface 300, as shown in FIG. 3.

As shown in FIG. 8B, schematic representation 850 includes an analog output adapter component 851. Analog output adapter component 851 performs a substantially similar function as analog output adapter component 801; therefore, only differences between analog output adapter components 801 and 851 will be further described.

In addition to the algorithms and algorithm points previously discussed with regards to analog output adapter component 801, analog output adapter 851 additionally includes feedback modifier component 852. Feedback modifier component 852 also includes several inputs, outputs, and algorithm points. As will be appreciated by those of ordinary skill in the relevant art(s), embodiments of analog output adapter component 851 that include feedback modifier component 852 may be especially useful for control loops that routinely utilize feedback. For example, PID control typically utilizes outputs associated with one or more field devices, which may be part of one or more control loops, as part of the PID control algorithm. In various embodiments, one or more parameters and/or expressions may be dynamic. In other words, based on feedback received via other adapter components, analog output adapter component 801 may provide dynamically changing parameter values. In this way, a user may define expressions and parameters that are based on control loop feedback (e.g., PID control weights) to tune the control loop function accordingly.

Figure 9:
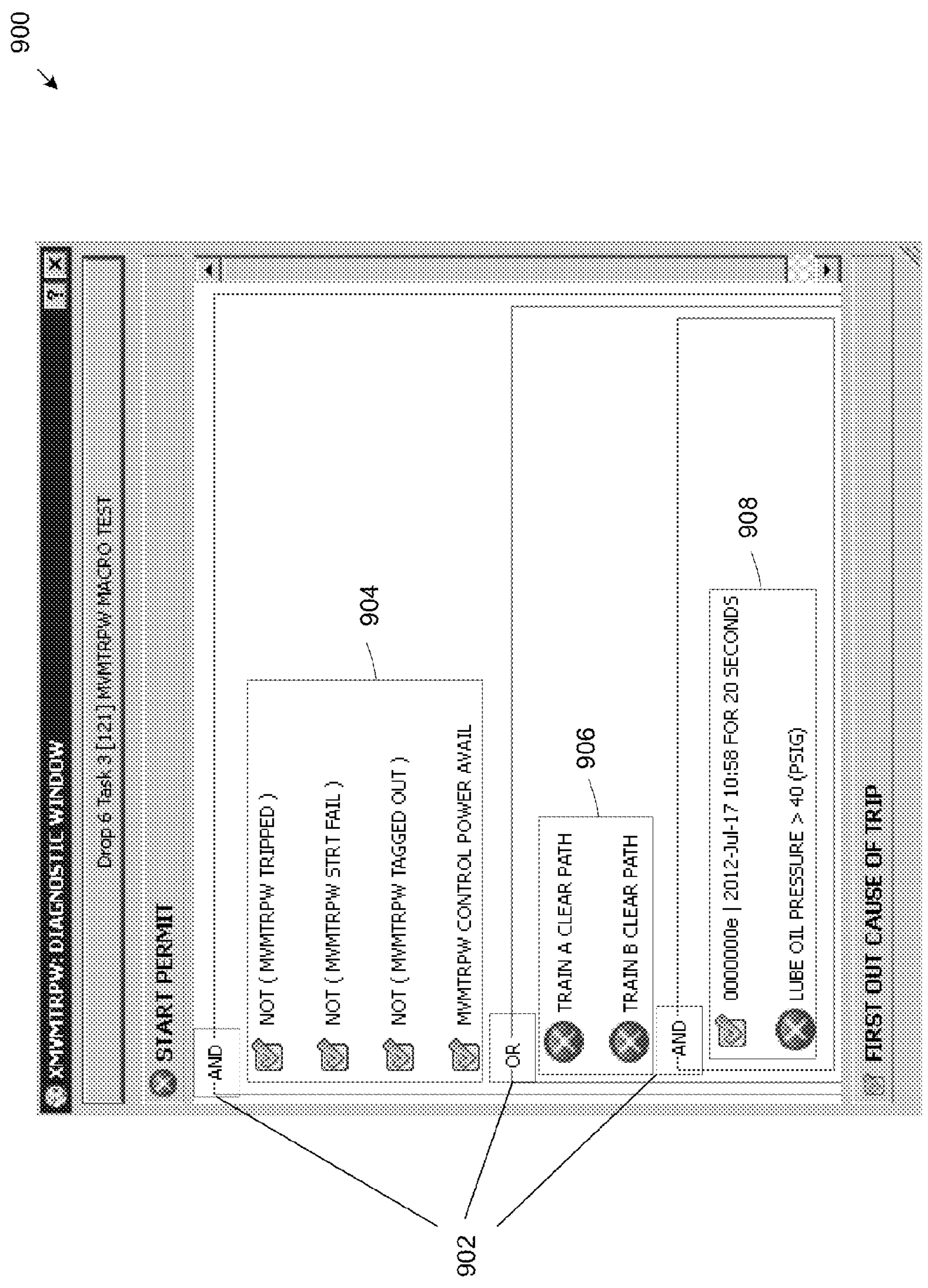
FIG. 9 is an example adapter diagnostic window 900 indicating logical expression states incorporating natural language in accordance with various embodiments of the present disclosure.

FIG. 9 is an example adapter diagnostic window 900 indicating logical expression states incorporating natural language in accordance with various embodiments of the present disclosure. In an embodiment, adapter diagnostic window 900 is utilized in conjunction with instantiation of a native control component, such as native control components 310 or 318, as shown in FIG. 3. In various embodiments, adapter diagnostic window 900 is displayed as part of a graphical programming interface, such as graphical programming interface 300, as shown in FIG. 3.

In various embodiments, a user view the active feedback of the control loop for a specific adapter in terms of natural language using display window 900. As previously discussed, a user may enter one or more expressions and/or parameters as part of various adapters. In accordance with these embodiments, a user may define these input expressions in a natural language manner. In other words, a user may setup and/or rename expression states to clearly indicate the parameters and the relationship between the parameters within an expression. In such embodiments, these expressions may provide more insight when viewed in display window 900.

As shown in FIG. 9, display window 900 illustrates various logical aggregators and logical expressions for an adapter component that corresponds to start permit logic, such as an in-line adapter component, for example. In various embodiments, a user could select a desired native control component, which would then generate display window 900, to view diagnostic information associated with the adapter for that respective native control component.

In the example shown in FIG. 9, display window 900 includes three separate logical aggregators. For example, display window 900 indicates that a start permit signal has not been generated, as denoted by the red "X" next to the "start permit" bar. A user can then follow the natural language expressions displayed in display window 900 to diagnose the issue preventing the start permit from being generated. Using a nested structure, display window 900 allows a user to quickly identify the state of each of the adapter expressions.

For example, the four expressions 904 under the first AND logical aggregator are all true, so a user could determine that the issue is not from any of the inputs evaluated by these expressions. But due to the nested structure, to generate a start permit signal it is also required that either (1) one of the two expressions 906 under the OR logical aggregator is true, or (2) both of the two expressions 908 under the second AND logical aggregator are true. Because of the nested structure, a user can quickly identify that neither of these conditions are satisfied by the state of their respective input expressions. As a result, a user can then determine whether to investigate the lube oil pressure, or to investigate one of train paths A or B.

In addition, several different types of expressions are illustrated in FIG. 9. For example, expressions 904 and 906 are digital expressions. In other words, they have a value of true or false based on the status of the assigned condition in which they are associated. When a user sets up an adapter using these types of expressions, a user could specify the device associated with the condition, and set a condition of true or false as the parameter to be associated with these logic states.

However, expressions 908 are examples of analog expressions. The first expression is an example of an analog expression that indicates a state that is true when one or more conditions are satisfied in accordance with one or more user-specified parameters. For example, the input associated with the first input expression is true when an input state is held for 20 seconds or more. When a user sets up an adapter using this type of expression, a user could specify the device associated with the condition "0000000e," which could be modified to reflect a more informative reference in terms of natural language, if desired. Furthermore, a user could set the 20 second time period value, and then set conditions of true and false associated with the condition "0000000e" being greater than or less than the 20 second time period, respectively (or vice-versa), as the parameters to be associated with this expression.

Similarly, when a user sets up an adapter using the second expression from input expressions 908, a user could specify the device associated with the lube oil pressure condition, set the 40 PSIG value, and set conditions of true and false associated with the lube oil pressure condition being above and below the 40 PSIG value, respectively (or vice-versa), as the parameters to be associated with this expression.

Figure 10:
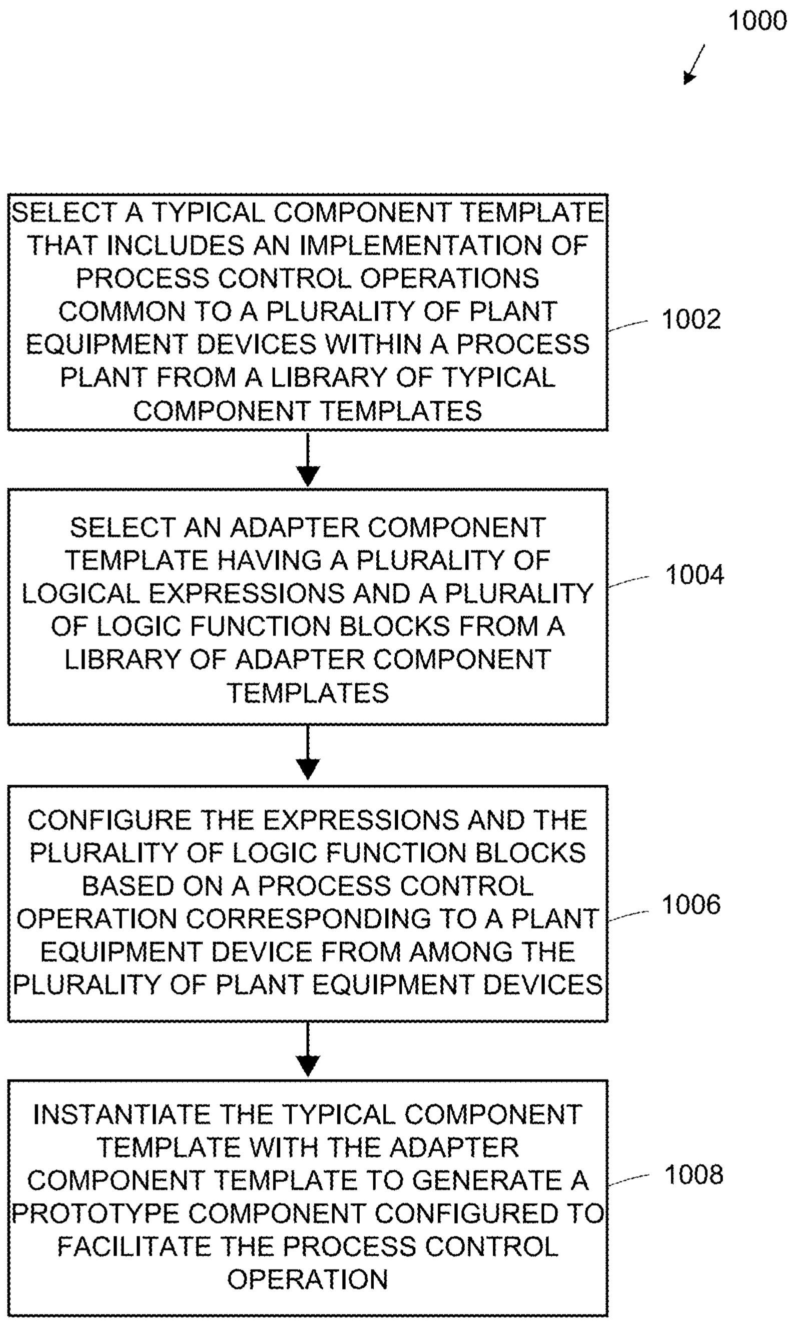
FIG. 10 is flow diagram of example method in accordance with various embodiments of the present disclosure.

FIG. 10 is flow diagram of example method in accordance with various embodiments of the present disclosure. In various embodiments of the disclosure, method 1000 is performed by one or more processors, such as process controller 11, as shown in FIG. 1, or native control component instantiating engine 307, as shown in FIG. 3, for example.

Method 1000 starts at block 1002, which includes a user selecting a typical component template that includes an implementation of process control operations common to a plurality of plant equipment devices within a process plant from a library of typical component templates. This selection could include, for example, the selection of one or more templates and adapters from adapter template library 302 in accordance with graphical programming interface 300, as shown in FIG. 3.

At block 1004, method 1000 includes a user selecting an adapter component template having a plurality of logical input expressions and a plurality of logic algorithms from a library of adapter component templates. This could include, for example, the selection of one or more templates and adapters from adapter template library 304 in accordance with graphical programming interface 300, as shown in FIG. 3.

At block 1006, method 1000 includes a user configuring the input expressions and the plurality of logic algorithms based on a process control operation corresponding to a plant equipment device from among the plurality of plant equipment devices. This could include, for example, a user defining one or more input expressions, output expressions, and/or their respective parameters, as indicated in the options selected block 308, as shown in FIG. 3, for example.

At block 1008, method 1000 includes instantiating the typical component template with the adapter component template to generate a native control component configured to facilitate the process control operation. This could include, for example, a user performing an instantiation of the adapter and typical component templates to generate a native control component, as shown in FIG. 3. In an embodiment, the instantiation is performed by an instantiation engine, such as native control component instantiation engine 307, for example, as shown in FIG. 3.

While the present system and methods have been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The invention claimed is:

1. A process control configuration method for developing a process control strategy in a process plant, comprising:

selecting, by one or more processors, a typical component template from a library of typical component templates that defines an implementation of a process control loop function that may be utilized by a plurality of plant equipment devices within a process plant;

selecting, by one or more processors, a first and a second adapter component template from a library of adapter component templates, the first and the second adapter component templates having one or more configurable logical expressions or one or more configurable logic algorithms;

configuring, by one or more processors, the first and the second adapter component templates based on a specific process control operation associated with each of a first and a second plant equipment device, respectively, from among the plurality of plant equipment devices, wherein configuring the first and the second adapter component templates includes defining the one or more configurable logical expressions or the one or more configurable logic algorithms to specify how the first and the second adapter component templates interact with the typical component template and signals to or from the first and the second plant equipment devices to define for the first and the second plant equipment devices, respectively, the specific process control operation utilizing the process control loop function defined by the typical component template, wherein the process control loop function includes one or more of: (i) a proportional-integral-derivative control operation, (ii) a proportional-integral control operation, (iii) a start permit control operation, (iv) an alarm control operation, or (v) a native control component operation;

instantiating, by one or more processors, the typical component template with each of the first and the second adapter component templates, respectively, to generate a first and a second native control component, respectively; and executing, by one or more processors associated with one or more process controllers communicatively coupled to one or more host work stations and the plurality of plant equipment devices, the first and second native control components for the first and the second plant equipment devices, respectively, wherein the first native control component, when executed, performs the specific process control operation for the first plant equipment device utilizing the process control loop function defined by the typical component template in accordance with the configured first adapter component template, and wherein the second native control component, when executed, performs the specific process control operation for the second plant equipment device utilizing the process control loop function defined by the typical component template in accordance with the configured second adapter component template.

2. The process control configuration method of claim 1, wherein the acts of selecting the typical component template, selecting the first and the second adapter component templates, configuring the first and the second adapter component templates, and instantiating the typical component template with the first and the second adapter component templates are performed via a graphical programming interface.

3. The process control configuration method of claim 1, wherein the act of instantiating comprises:

instantiating the typical component template with the first and the second adapter component templates to generate the first and the second native control components as machine-readable code that is executable by one or more processors to execute the specific process control operation.

4. The process control configuration method of claim 1, wherein the one or more configurable logical expressions include one or more user-definable parameters based on the specific process control operation.

5. The process control configuration method of claim 1, wherein the one or more configurable logic algorithms provide one or more logic states based on whether conditions are satisfied in accordance with the one or more configurable logical expressions.

6. The process control configuration method of claim 1, wherein the one or more configurable logical expressions or the one or more configurable logic algorithms correspond to portions of one of more control operations including:

a first-out alarm control operation;

one or more weights corresponding to a proportional-integral-derivative control operation;

one or more weights corresponding to a proportional-integral control operation;

one or more inputs to an alarm control operation; and one or more inputs to a start permit control operation.

7. The process control configuration method of claim 5, further comprising:

displaying an adapter diagnostic window indicating the one or more logic states in terms of natural language.

8. The process control configuration method of claim 1, wherein configuring the first and the second adapter component templates further includes (i) specifying signal connections between the first plant equipment device, the first adapter component template, and the typical component template, and (ii) specifying signal connections between the second plant equipment device, the second adapter component template, and the typical component template.

9. The process control configuration method of claim 1, wherein configuring the first adapter component template further includes specifying the one or more configurable logical expressions or the one or more configurable logic algorithms as a function of one or more inputs received from the second adapter component to define dynamic feedback for the process control loop function.

10. The process control configuration method of claim 5, further comprising:

for each of the first and the second adapter component templates, displaying an adapter diagnostic window that (i) concurrently presents each of the one or more logic states associated with the first and the second adapter component templates in terms of natural language, and (ii) identifies an overall state of the first and the second adapter component templates.

11. A process control system, comprising:

a typical template generation engine configured to generate a typical component template that defines an implementation of a process control loop function that may be utilized by a plurality of plant equipment devices within a process plant;

an adapter template generation engine configured to generate a first and a second adapter component template, the first and the second adapter component templates having one or more configurable logical expressions or one or more configurable logic algorithms;

a processor configured to provide a graphical programming interface to allow for modification of the first and the second adapter component templates based on a specific process control operation associated with each of a first and a second plant equipment device, respectively, from among the plurality of plant equipment devices, wherein the modification of the first and the second adapter component templates includes defining the one or more configurable logical expressions or the one or more configurable logic algorithms to specify how the first and the second adapter component templates interact with the typical component template and signals to or from the first and the second plant equipment devices to define for the first and the second plant equipment devices, respectively, the specific process control utilizing the process control loop function defined by the typical component template, wherein the process control loop function includes one or more of: (i) a proportional-integral-derivative control operation, (ii) a proportional-integral control operation, (iii) a start permit control operation, (iv) an alarm control operation, or (v) a native control component operation, and a native control instantiating engine configured to instantiate the typical component template with each of the first and the second adapter component templates, respectively, to generate a first and a second native control component, respectively, wherein the first native control component, when executed by one or more processors associated with one or more process controllers communicatively coupled to one or more host work stations and the plurality of plant equipment devices, performs the specific process control operation for the first plant equipment device utilizing the process control loop function defined by the typical component template in accordance with the modified first adapter component template, and wherein the second native control component, when executed by one or more processors associated with one or more process controllers communicatively coupled to one or more host work stations and the plurality of plant equipment devices, performs the specific process control operation for the second plant equipment device utilizing the process control loop function defined by the typical component template in accordance with the modified second adapter component template.

12. The process control system of claim 11, wherein the native control instantiating engine is further configured to generate the native control component as machine-readable code that is executable by one or more processors to perform the specific process control operation.

13. The process control system of claim 11, wherein the adapter template generation engine is further configured to generate the first and the second adapter template components having the one or more configurable logical expressions including one or more user-definable parameters based on the specific process control operation.

14. The process control system of claim 11, wherein the adapter template generation engine is further configured to generate the first and the second adapter template components having the one or more configurable logic algorithms providing one or more logic states based on whether conditions are satisfied in accordance with the one or more configurable logical expressions.

15. The process control system of claim 11, wherein the adapter template generation engine is further configured to generate the first and the second adapter template components having the one or more configurable logical expressions or the one or more configurable logic algorithms corresponding to portions of one of more control operations including:

a first-out alarm control operation;

one or more weights corresponding to a proportional-integral-derivative control operation;

one or more weights corresponding to a proportional-integral control operation;

one or more inputs to an alarm control operation; and one or more inputs to a start permit control operation.

16. The process control system of claim 14, wherein the processor is further configured to display an adapter diagnostic window indicating the one or more logic states in terms of natural language.

17. The process control system of claim 11, wherein the modification of the first and the second adapter component templates further includes (i) specifying signal connections between the first plant equipment device, the first adapter component template, and the typical component template and (ii) specifying signal connections between the second plant equipment device, the second adapter component template, and the typical component template.

18. The process control system of claim 11, wherein the modification of the first adapter component template further includes specifying the one or more configurable logical expressions or the one or more configurable logic algorithms as a function of one or more inputs received from the second adapter component to define dynamic feedback for the process control loop function.

19. The process control system of claim 14, wherein the processor is further configured to display an adapter diagnostic window that (i) concurrently presents each of the one or more logic states associated with the first and the second adapter component templates in terms of natural language, and (ii) identifies an overall state of the first and the second adapter component templates.

20. A tangible, non-transitory, computer-readable medium storing instructions that, when executed by one or more processors, cause the one or more processors to display a graphical programming interface that allows a user to:

generate a typical component template that defines an implementation of a process control loop function that may be utilized by a plurality of plant equipment devices within a process plant;

generate a first and a second adapter component template, the first and the second adapter component templates having one or more configurable logical expressions or one or more configurable logic algorithms;

generate a graphical programming interface to allow for modification of the first and the second adapter component templates based on a specific process control operation associated with each of a first and a second plant equipment device, respectively, from among the plurality of plant equipment devices, wherein modification of the first and the second adapter component templates includes defining the one or more configurable logical expressions or the one or more configurable logic algorithms to specify how the first and the second adapter component templates interact with the typical component template and signals to or from the first and the second plant equipment devices, respectively to define for the first and the second plant equipment devices, respectively, the specific process control operation utilizing the process control loop function defined by the typical component template, wherein the process control loop function includes one or more of: (i) a proportional-integral-derivative control operation, (ii) a proportional-integral control operation, (iii) a start permit control operation, (iv) an alarm control operation, or (v) a native control component operation; and instantiate the typical component template with each of first and the second adapter component templates, respectively, to generate a first and a second native control component, respectively, wherein the first native control component, when executed, by one or more processors associated with one or more process controllers communicatively coupled to one or more host work stations and the plurality of plant equipment devices, performs the specific process control operation for the first plant equipment device utilizing the process control loop function defined by the typical component template in accordance with the modified first adapter component template, and wherein the second native control component, when executed, by one or more processors associated with one or more process controllers communicatively coupled to one or more host work stations and the plurality of plant equipment devices, performs the specific process control operation for the second plant equipment device utilizing the process control loop function defined by the typical component template in accordance with the modified second adapter component template.

21. The tangible, non-transitory, computer-readable medium of claim 20, wherein the instructions, when executed by one or more processors, cause the one or more processors to:

instantiate the typical component template with the first and the second adapter component templates by generating the native control component as machine-readable code that is executable by one or more processors to perform the specific process control operation.

22. The tangible, non-transitory, computer-readable medium of claim 20, wherein the instructions, when executed by one or more processors, cause the one or more processors to generate the one or more configurable logical expressions including one or more user-definable parameters based on the specific process control operation.

23. The tangible, non-transitory, computer-readable medium of claim 20, wherein the instructions, when executed by one or more processors, cause the one or more processors to generate the one or more configurable logic algorithms to provide one or more logic states based on whether conditions are satisfied in accordance with the one or more configurable logical expressions.

24. The tangible, non-transitory, computer-readable medium of claim 20, wherein the instructions, when executed by one or more processors, cause the one or more processors to generate the first and the second adapter component template to include the one or more configurable logical expressions or the one or more configurable logic algorithms corresponding to portions of one of more control operations including:

a first-out alarm control operation;

one or more weights corresponding to a proportional-integral-derivative control operation;

one or more weights corresponding to a proportional-integral control operation;

one or more inputs to an alarm control operation; and one or more inputs to a start permit control operation.

25. The tangible, non-transitory, computer-readable medium of claim 23, wherein the instructions, when executed by one or more processors, cause the one or more processors to display an adapter diagnostic window indicating the one or more logic states in terms of natural language.

26. The tangible, non-transitory, computer-readable medium of claim 20, wherein the instructions, when executed by one or more processors, further cause modification of the first and the second adapter component templates to include (i) specifying signal connections between the first plant equipment device, the adapter component template, and the typical component template, and (ii) specifying signal connections between the second plant equipment device, the second adapter component template, and the typical component template.

27. The tangible, non-transitory, computer-readable medium of claim 20, wherein the instructions, when executed by one or more processors, further cause modification of the first second adapter component template to include specifying the one or more configurable logical expressions or the one or more configurable logic algorithms as a function of one or more inputs received from the second adapter component to define dynamic feedback for the process control loop function.

28. The tangible, non-transitory, computer-readable medium of claim 23, wherein the instructions, when executed by one or more processors, cause the one or more processors to display an adapter diagnostic window that (i) concurrently presents each of the one or more logic states associated with the first and the second adapter component templates in terms of natural language, and (ii) identifies an overall state of the first and the second adapter component templates.

* * * * *